United States Patent [19]

Miller

[11] 4,279,563

[45] Jul. 21, 1981

[54] UNMANNED MATERIAL HANDLING SYSTEM FOR SERVICING A MULTI-LEVEL STRUCTURE

[75] Inventor: William R. Miller, Erie, Pa.

[73] Assignee: American Sterilizer Company, Erie, Pa.

[21] Appl. No.: 55,055

[22] Filed: Jul. 5, 1979

[51] Int. Cl.³ .............................................. B66F 11/00
[52] U.S. Cl. .................................... 414/611; 414/277; 191/2
[58] Field of Search ............... 414/277, 279, 284, 611; 180/2 R, 65 B, 165; 191/2

[56] References Cited

U.S. PATENT DOCUMENTS

| 2,589,453 | 3/1952 | Storsand | 180/165 X |
| 2,626,673 | 1/1953 | Storsand | 180/65 B |
| 3,743,116 | 7/1973 | Giessler et al. | 414/279 |
| 3,785,514 | 1/1974 | Forsyth et al. | 296/1 A |

FOREIGN PATENT DOCUMENTS 2161266  6/1973  Fed. Rep. of Germany ......... 180/65 B

OTHER PUBLICATIONS

Post, R. F. et al., "Flywheels", *Scientific American*, vol. 229, No. 6, Dec. 1973, pp. 17–23.

Primary Examiner—Robert W. Saifer
Attorney, Agent, or Firm—Robert D. Yeager

[57] ABSTRACT

An unmanned material handling system for servicing a plurality of vertically spaced levels of a structure is provided. This system includes an unmanned, self-propelled vehicle driven by an electromechanical device such as an electric motor. The vehicle includes an energy storage device, such as a flywheel, for storing energy and for supplying that energy to the electromechanical device. The vehicle can be moved from one level to another within the structure by an elevator. One half of a split transformer is embedded in the floor of the elevator and, when the vehicle is disposed thereover, that half of the split transformer is energized and becomes electromagnetically coupled with a second half of the split transformer which is disposed within the vehicle. This coupling provides electrical energy to drive a motor/generator which, in turn, causes the flywheel to rotate and store energy. When the elevator reaches the desired level, the mechanical energy stored by the rotating flywheel is converted to electrical energy by the motor/generator for transmission to an electro-mechanical propulsion device thereby propelling the vehicle.

7 Claims, 5 Drawing Figures

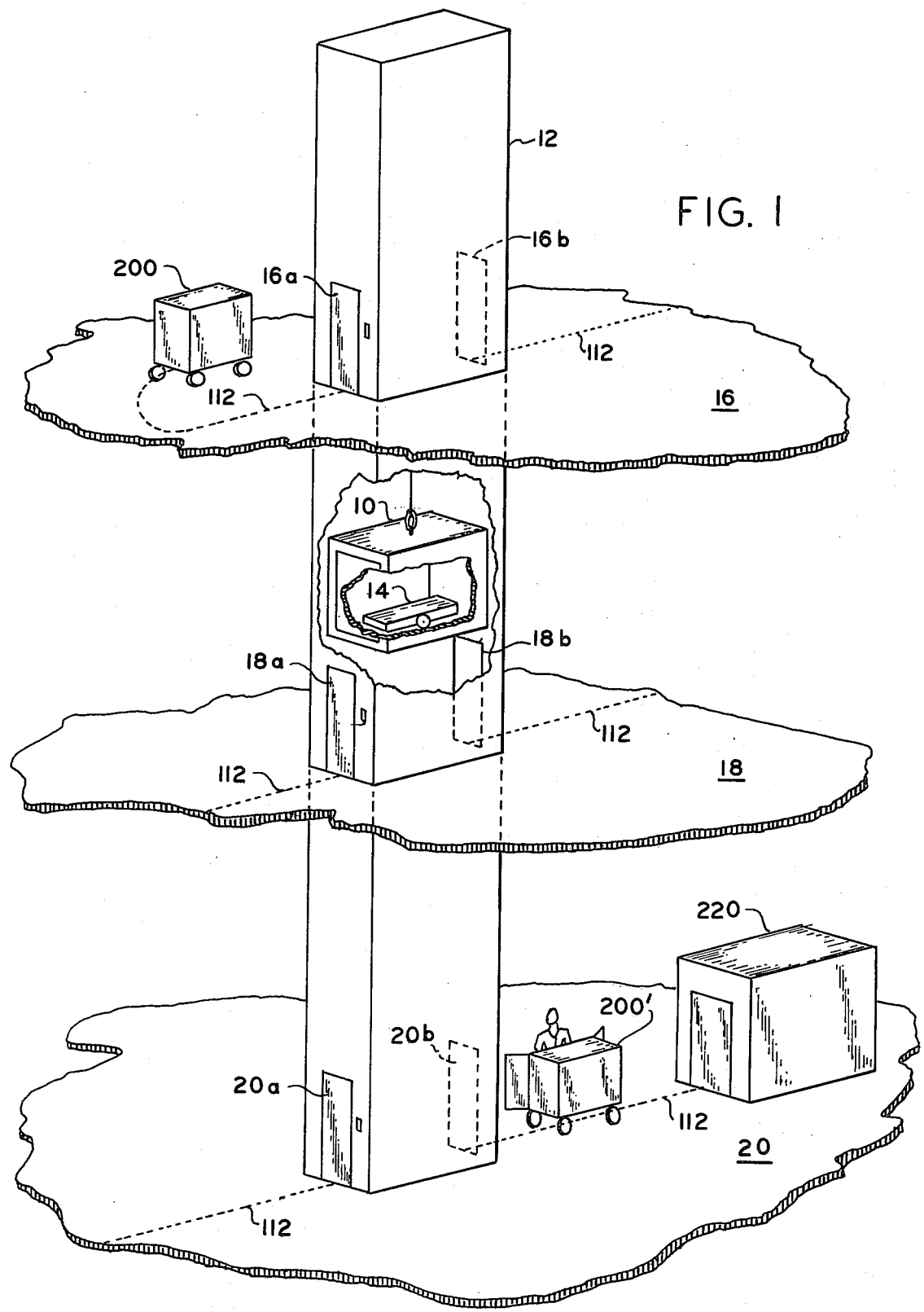

UNMANNED MATERIAL HANDLING SYSTEM FOR SERVICING A MULTI-LEVEL STRUCTURE

BACKGROUND OF THE INVENTION

1. Field of the Invention

This invention relates to material handling systems and, more particularly, to an unmanned system for moving material within a structure having a plurality of vertically spaced levels, such as a hospital.

2. Description of the Prior Art

The efficient handling of material within structures not exclusively devoted to material storage, such as warehouses, has long been a problem to designers of material handling systems because the system must take into account primarily the nature of the activity being conducted within the structure. In other words, the material handling system must be designed around the activity rather than vice versa. The problem has become increasingly complex with the tendency toward construction of high-rise structures, which conserve expensive real estate, compared with the relative ease with which material can be handled in sprawling one-or two-story buildings.

A typical though not limiting example of complex material handling problems is that posed by a hospital with multiple floors. A prime concern in the design and organization of a hospital is to minimize the possible spread of germs or disease, which inherently are present, from one area to another. Yet enormous amounts of food, waste, and supplies and equipment (both clean and contaminated) must be moved within a hospital almost on a constant basis. In keeping with the principle of avoiding disease and germ proliferation, therefore, hospital planners have sought ways to move these materials without moving people with them because, of course, humans potentially represent major carriers of disease and germs. Another objective is to efficiently move such materials without comingling soiled materials with clean materials.

Typical of a material handling system designed for hospital use that minimizes human participation is the system shown in Beecher et al. U.S. Pat. No. 3,453,659. That system may use self-propelled electric vehicles of the type illustrated in Kohls U.S. Pat. No. 3,557,893 or Melke U.S. Pat. No. 4,044,853. These vehicles are adapted to be loaded with material to be moved throughout the hospital. Generally, the system involves the vertical movement of the driverless vehicles in elevators and rather long horizontal excursions of the vehicles on the hospital floors, the latter being accomplished by well-known vehicle guidance systems such as an embedded cable in the floor.

A major shortcoming of the system just discussed is the fact that the vehicles are powered by electric storage batteries. At the present time, such batteries are bulky, employ wet cells and require relatively long periods for recharging. Thus the use of wet storage batteries means labor expended in handling and recharging, potential danger with the chemicals present, and increased costs for maintaining a sufficient inventory of batteries to allow for out-of-service periods.

An alternative to the electric vehicle system for hospital use is a dumbwaiter system; examples of the latter are shown in Guilbert U.S. Pat. Nos. 3,432,055; 3,565,215; and 3,565,270. The dumbwaiter system employs an elevator or lift which contains the necessary mechanism to engage standard hospital carts queued in position outside the elevator doors and pull them into the elevator. Upon reaching the discharge floor, the mechanism within the elevator extends to place the carts at a predetermined position outside the elevator doors.

While the dumbwaiter system does minimize the vertical movement of attendants within the hospital, it has the drawbacks of allowing only restricted horizontal movement at the hospital floors and requiring that an elevator be dedicated to the system. Considering the expense of and limited space available for elevators in a multi-floor hospital, the latter drawback is serious.

SUMMARY OF THE INVENTION

The present invention overcomes the shortcomings of known unmanned material handling systems adapted for use in multi-floor buildings. The system of the invention includes an unmanned, self-propelled vehicle that does not rely on wet-cell storage batteries for power but rather has rapidly chargeable energy storage means, preferably a flywheel, to provide motive power to the vehicle. The mechanical energy storage means has the advantage of being rechargeable while the vehicle is moving from floor to floor in the structure that the vehicle is servicing. Further, the vehicle is capable of making horizontal excursions from the means that transports it vertically within the structure. Still further, the system of the present invention does not require that a vertical transport means be dedicated to it; when the system is not in use, the vertical transport means may be used for other purposes including the safe transport of people.

The present invention provides a material handling system for servicing a plurality of vertically spaced levels of a structure, the system comprising: an unmanned vehicle adapted to transport cargo between the vertically spaced levels; electro-mechanical drive means for propelling the vehicle along a surface of a selected one of said levels; means disposed within the vehicle for storing energy and for importing the stored energy to the electro-mechanical drive means; means for vertically moving the vehicle to each of the spaced levels; and means coupling the vehicle and the vertical moving means while the vehicle is supported by the vertical moving means for transmitting energy from an external source to the energy storage means.

In a preferred embodiment, the energy storage means of the present invention includes a flywheel which is operably connected to the electro-mechanical drive means which itself preferably includes a motor/generator. Also in a preferred embodiment, the energy transmission means of the present invention comprises a split transformer, one half of which is carried by the vertical moving means and is energized by an external source, and the other half of which is disposed in the vehicle and transmits energy induced therein to the motor portion of the motor-generator for charging the flywheel. Further, the invention preferably provides means for positioning the vehicle with respect to the vertical moving means to accomplish the coupling therebetween for flywheel recharging.

Other features and advantages of the present invention will become apparent as the following detailed description, taken with the accompanying drawings, proceeds.

BRIEF DESCRIPTION OF THE DRAWINGS

FIG. 1 is a fragmentary perspective view, with parts broken away to illustrate details, of a structure having vertically spaced levels being serviced by the present invention;

DESCRIPTION OF THE PREFERRED EMBODIMENT

Figure 3:
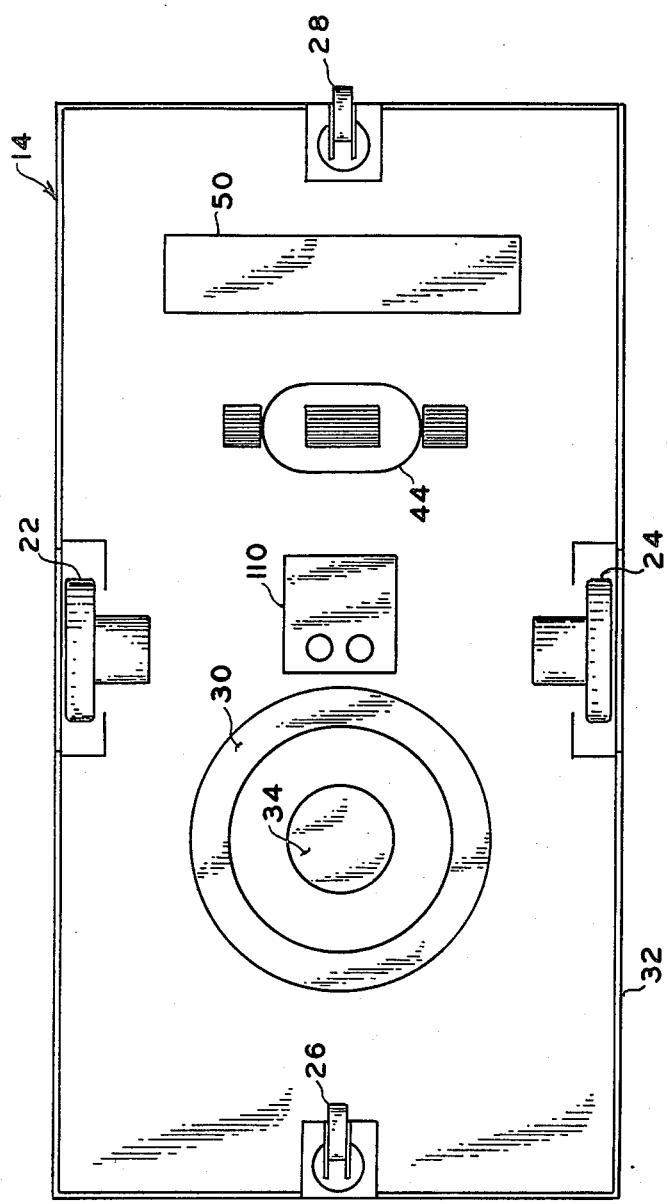
FIG. 3 is a bottom plan view of the vehicle shown in FIG. 2.

Referring to the drawings, particularly to FIG. 1, there is shown in schematic form the system of the present invention in which a conventional elevator car 10, moving vertically in elevator shaft 12, is transporting an unmanned, self-propelled vehicle 14 between floors 16, 18 and 20, respectively, of a building, in this case, a hospital. Ideally, elevator shaft 12 is arranged within the hospital so that there are oppositely facing doors 16A 16B; 18A, 18B; and 20A, 20B at floors 16, 18 and 20, respectively. This door arrangement permits vehicle 14 to make excursions to either side of elevator shaft 12 and thus affords greater flexibility in the observance of the clean/soiled doctrine which is discussed below.

Figure 2:
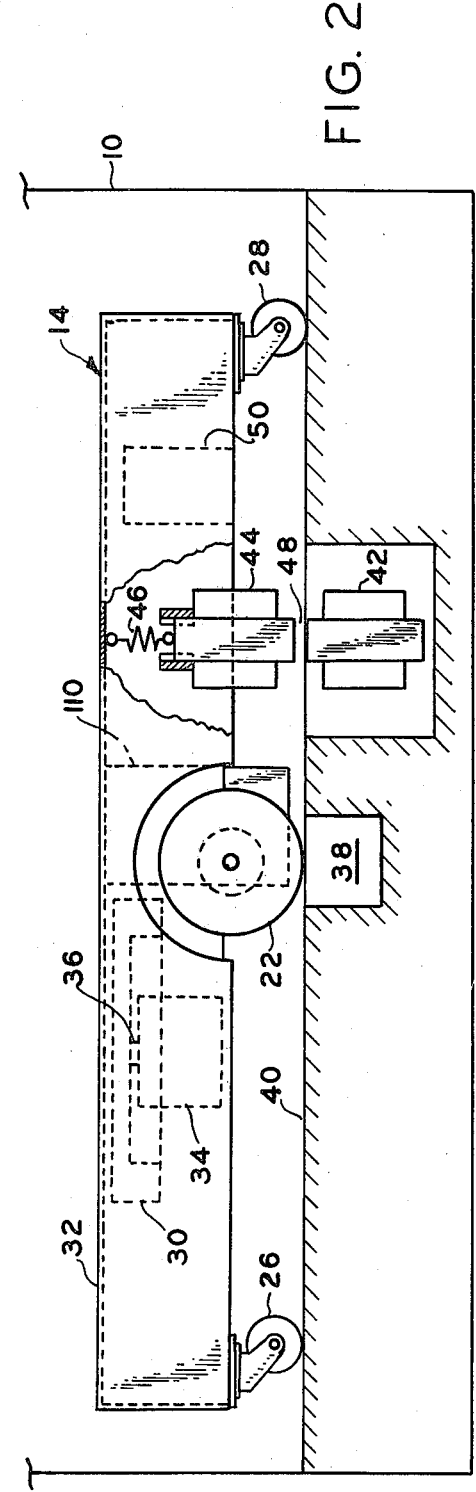
FIG. 2 is a side elevational view of a vehicle for use in the present invention, the vehicle being supported in vertical moving means which is only partially shown.

Before discussing in detail the operation of the system of the present invention, it will be helpful to describe the structure and operation of vehicle 14. Referring first to FIGS. 2 and 3, there is shown a low-profile, wheeled vehicle 14. In the embodiment shown in the drawings, vehicle 14 is provided with a Panzer drive which includes driven wheels 22 and 24 mounted on opposite sides of vehicle 14 approximately intermediate its length and caster wheels 26 and 28 mounted on the longitudinal center line of vehicle 14 at each end. As will be described hereinafter, each of wheels 22 and 24 is independently driven in either direction of rotation. Steering of vehicle 14 is accomplished by controlling the direction and amount of power supplied to each wheel motor. Thus, vehicle 14 may be propelled in a straight line in either direction and caused to turn in either direction; the Panzer drive permits sharp turning of the vehicle as will be described hereinafter. If instead of a Panzer drive, a single drive motor is used on vehicle 14, say through a differential, a separate steering wheel or steering wheels, suitably activated, would be provided. As will be appreciated by those skilled in the art, other types of transport means, such as an air film cushion system or endless traction treads, may be employed on vehicle 14 instead of wheels.

Vehicle 14 is powered by mechanical energy stored in a rotating flywheel 30 mounted within the frame 32 of vehicle 10. Flywheel 30 may be constructed of any suitable material such as fiber composites according to well-known techniques and may be of any suitable design; see "Flywheels" by Post and Post, *Scientific American*, Vol. 229, No. 6, p.17, December 1973. Flywheel 30 transmits mechanical energy to motor/generator 34 through connecting shaft 36. Ideally both flywheel 30 and motor/generator 34 are housed in a vacuum chamber (not shown) within the frame 32 of vehicle 14 that can be evacuated to reduce the effects of friction on flywheel 30. Such an arrangement is advantageous because it eliminates the need for complex seals around shaft 36 that otherwise would be required if motor/generator 34 were not disposed within the vacuum chamber or if the energy were transmitted purely mechanically to the wheels. The mechanical energy supplied to motor/generator 34 is converted by motor/generator 34 operating in the generator mode to electrical energy which is further transmitted to drive wheels 22 and 24 in a manner soon to be described.

A principal feature of the system of the present invention is the provision of means for recharging flywheel 30 while vehicle 14 is in elevator car 10. When vehicle 10 enters elevator car 10 after completing an excursion therefrom, positioning control means 38, represented in FIG. 2 as a control box embedded in the floor 40 of elevator car 10, operates according to any one of a variety of well-known techniques, such as the use of embedded magnets in combination with reed switches on vehicle 14 or non-contact proximity switches, to precisely stop vehicle 14 in position for coupling it to an energy source carried by elevator car 10. In the embodiment shown in the drawings, recharging of flywheel 30 is accomplished by use of a split transformer, one half of which 42 is embedded in the floor 40 of elevator car 10 and the other half of which 44 is mounted on the underside of vehicle 14.

The winding of elevator transformer half 42 is connected to a suitable source of AC electrical energy, which is typically available in conventional elevators. When the two transformer halves 42 and 44 are aligned by operation of positioning control means 38 as described above, the energization of elevator transformer half 42 causes it to be electromagnetically coupled to vehicle transformer half 44. This electromagnetic coupling causes a voltage to be induced in vehicle transformer half 44 and, if the latter is mounted by means of a tension spring 46, vehicle transformer half 44 will tend to move toward elevator transformer half 42, thereby reducing air gap 48 and resulting in an even more efficient coupling. The electrical energy induced in vehicle transformer half 44 by the energization of elevator transformer half 42 is transmitted to motor/generator 34 in a manner soon to be described so that motor/generator 34, operating in the motor mode, may transmit mechanical energy via shaft 36 to accelerate the speed of rotation of flywheel 30.

It may be seen, therefore, that flywheel 30 may be recharged while elevator car 10 is moving between floors, thereby permitting vehicle 14 to commence a new excursion at a selected floor with a high level of stored energy. It will be appreciated by those skilled in the art that if a type of electric battery is commercially available that will accept a charge at rates comparable to those presently achieved by a rotating inertia, such a battery could be used in place of flywheel 30, in which case the motive power for vehicle 14 would be furnished by an electrical energy storage means rather than by the mechanical energy storage means described herein.

It also will be appreciated by those skilled in the art that a variety of flywheel charging means may be used in place of the split transformer described herein. Examples of such alternate means are (i) conventional electrical contacts such as a plug/socket arrangement between vehicle 14 and elevator car 10 (ii) a rotating electromagnetic coupling involving a flat motor embedded in floor 40 driving a disc-type rotor mounted in vehicle 14 or (iii) an elevator-mounted air compressor with an orifice aligned with an air turbine mounted in vehicle 14. These and other flywheel recharging means would all accomplish the desired objective of rapidly charging the energy storage means within vehicle 14 as it is moved between floors to maximize the power available to vehicle 14 for its next excursion and reduce the overall time that elevator car 10 must be dedicated to carrying vehicle 14.

In this latter regard, a distinct advantage of the system of the present invention is that elevator car 10, especially when fitted with the split transformer energization means described above, may be used for conventional purposes including transporting people when vehicle 14 is not operating. This feature permits more efficient utilization of space in a building and reduces costs. Because the elevator transformer half 42 is embedded in floor 40 and no electrically hot contacts are exposed to occupants of elevator car 10, no hazard of electrical shock is present even if the winding of transformer half 42 is accidentally energized. Furthermore, no equipment adjustments within elevator car 10 are necessary to convert it to use as a personnel carrier. Even though the transformer core is isolated from the coil wires by the coil insulation, an insulating cover can be provided over the top of split transformer core 42 to provide even more electrical isolation between transformer core 42 and any personnel within elevator car 10.

Figure 5:
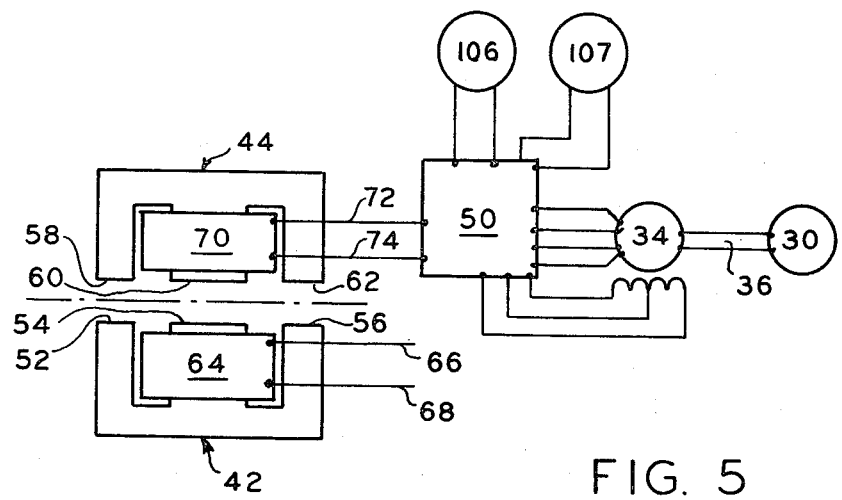
FIG. 5 is a diagrammatic representation of one form of energy storage and drive system for use in the present invention.
Figure 4:
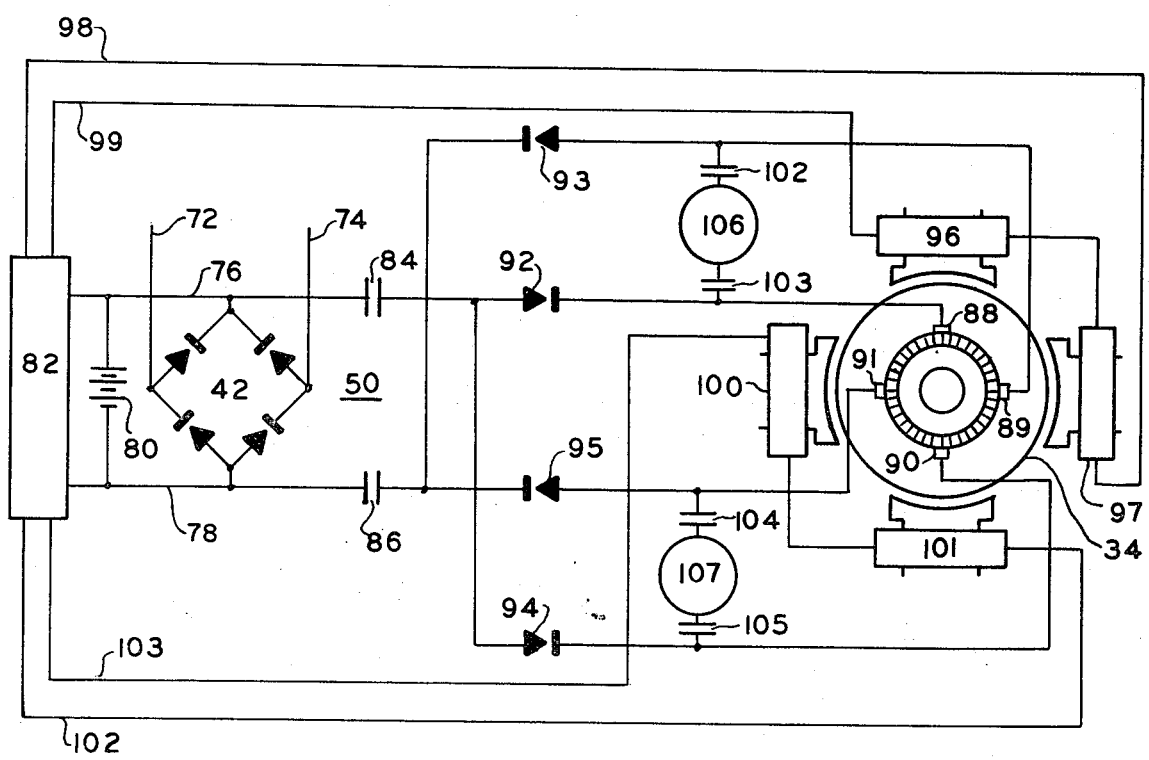
FIG. 4 is a schematic circuit diagram of one form of energy storage means and electro-mechanical drive means for use in the present invention.

Referring now to FIGS. 4 and 5, there are shown exemplary circuit diagrams for accomplishing the energy storage recharging function and propulsion functions of the present invention. These functions are controlled by well-known means contained within vehicle controller 50. When vehicle 14 is in elevator car 10 and is properly positioned for energy storage means recharging as described above, the legs 52, 54 and 56 of elevator transformer half 42 are adjacent the corresponding legs 58, 60 and 62 of vehicle transformer half 44. Electrical energy supplied to winding 64 of elevator transformer half 42 through lines 66 and 68 electromagnetically induces electrical energy in winding 70 of vehicle transformer half 44, which energy is transmitted to vehicle controller 50 through lines 72 and 74. This alternating current is rectified by full wave bridge 42 to DC current, which is then available to DC bus lines 76 and 78. Battery 80, which can be used to supply miscellaneous control power, can be recharged from DC bus lines 76 and 78. Alternately, control power can be provided by an exciter mounted on motor/generator 34.

DC bus lines 76 and 78 also provide power to field controller 82. During the period of energy storage means recharging, vehicle controller 50 provides a signal which causes contacts 84 and 86 to close. Positive voltage thereby is applied to brushes 88 and 90 of motor-generator 34 through diodes 92 and 94, respectively; and negative voltage is applied to brushes 89 and 91 through diodes 93 and 95, respectively. Field controller 82 applies the proper voltage to field 96 and 97 through field lines 98 and 99, and to field windings 100 and 101 through field lines 102 and 103 to cause machine 34 to operate as a motor.

The voltage applied to field windings 96, 97, 100 and 101 by field controller 82 during the recharging operation is such that the back EMF of motor/generator 34 is lower than the voltage on DC bus lines 76 and 78. As a consequence, electrical energy flows into motor/generator 34 causing it to operate in the motor mode and accelerate flywheel 30 through shaft 36. When flywheel 30 reaches its desired maximum rotational velocity, field controller 82 increases the voltage applied to field windings 96, 97, 100 and 101 to a level such that the back EMF of motor/generator 34 is increased to a level that allows only enough energy to flow into motor/generator 34 from bus lines 76 and 78 to negate the frictional losses of flywheel 30 and thereby maintain the desired maximum rotational velocity of flywheel 30.

When elevator car 10 reaches a preselected floor, say floor 16 in FIG. 1, elevator doors 16A open and vehicle controller 50 provides a signal which causes contacts 84 and 86 to open, thereby disconnecting motor/generator 34 from DC bus lines 76 and 78, and closing propulsion contacts 102 through 105. The closing of these latter contacts connects drive motors 106 and 107 across brushes 88 and 89, and 90 and 91, respectively, of motor-generator 34. This action causes motor/generator 34 to operate in the generator mode and supply power to drive motors 106 and 107, which in turn drive wheels 22 and 24 to propel vehicle 14.

If vehicle controller 50 signals vehicle 14 to go straight ahead, voltages of the same magnitude will be applied to drive motors 106 and 107 so that both will cause wheels 22 and 24 to rotate forward at the same speed. If vehicle 14 is signalled to turn, field controller 82 will apply unequal voltages to either pair of field windings 96, 97 or 100, 101 through their respective field lines, depending upon the direction change required. In fact, if a sharp turn is required, after exiting elevator car 10 the Panzer drive feature of the present invention would be invoked and the voltage to one field winding pair 96, 97 or 100, 101 would actually be reversed, causing vehicle 14 to pivot on the drive wheel associated with the reversed field. The application of unequal voltage to field winding pairs 96, 97 and 100, 101 causes motor/generator 34 to supply unequal voltage to drive motors 106 and 107 which causes the drive wheels 22 and 24 to rotate at different speeds. Such action causes vehicle 14 to change direction. Similarly, to cause vehicle 14 to again travel in a straight line, equal voltages would be applied to field windings 96, 97 and 100, 101 so that both wheels rotate at the same speed. To reverse the direction of vehicle 14, it is necessary to reverse the voltage applied to field windings 96, 97 and 100, 101. Speed changes for vehicle 14 are accomplished by applying greater or lesser voltages equally to field winding pairs 96, 97 and 100, 101.

In an alternate embodiment, propulsion of vehicle 14 could be accomplished with a single drive motor in conjunction with a steering motor. In this alternate embodiment, the motor/generator 34 would be a simple "single" output 11 machine. The field controller for the steering motor would be similar to the field controller 82.

Vehicle 14 is provided with a suitable braking system. When vehicle 14 is being braked or otherwise decelerates, drive motors 106 and 107 may be arranged to operate as generators to supply regenerative power to flywheel 30 through motor/generator 34.

Control of the movement of vehicle 14 is accomplished by means well-known in the art. For example, a guidance controller 110 is provided on vehicle 14 to receive signals from a variety of sources such as cables 112 embedded in floors 16, 18 and 20; reflective strips on the floor surface; or a central command center (not shown). For safety purposes, overrides may be provided on guidance controller 110 to permit manual operation of vehicle 14 if that becomes necessary or desirable. In any case, guidance controller 110 feeds information to vehicle controller 50 which, by use of well-known techniques, controls the electro-mechanical drive and energy storage means of vehicle 14 described above. Exemplary of guidance control systems that may be useful with the present invention are those described in U.S. Pat. Nos. 3,322,225; 3,411,603; 3,493,920; 3,498,403; and 3,768,586.

The operation of the system of the present invention will now be described; to best illustrate the system's advantages, the description will relate to the application of the invention to a multi-story hospital building as depicted in FIG. 1. Standard hospital practice calls for the observance of what may be termed the "clean/soiled" doctrine. This doctrine calls for designating separate areas or rooms on each floor for the temporary storage of clean goods (including equipment, supplies and fresh food) and soiled (or contaminated) goods (such as bed linens, dishes, surgical instruments, etc.). Because practically all of these goods are transported in a hospital by conventional four-wheeled carts of various designs (such carts are designated in FIG. 1 by the reference numerals 200 and 200'), "clean" carts typically are queued in one area on the hospital floor for further distribution or use and "soiled" carts are queued in an entirely separate area for return to laundry, kitchen or disposal areas frequently located in the basement of the hospital. Under ideal circumstances, these "clean/soiled" designated areas are separated by a wall which divides the elevator shaft 12 used for transporting the carts. In such an arrangement, the use of oppositely facing doors at each floor effectively "locks out" one area from the other and thereby prevents possible contamination of clean goods.

In FIG. 1, the system control center (not shown) has summoned vehicle 14 to floor 16 for the purpose of loading cart 200, which is present in the soiled area, and returning it to floor 20 for unloading and passage through cart washer 220. While vehicle 14 is in elevator car 10, its flywheel 30 is being recharged as described above. Upon arrival at floor 16, elevator doors 16A open while doors 16B leading to the clean area on floor 16 remain closed.

When doors 16A open, flywheel recharging is terminated automatically and motor/generator 34 is placed in the generator mode. Stored mechanical energy in flywheel 30 is converted to electrical energy for driving wheels 22 and 24 according to the commands of vehicle controller 50. Vehicle 14 thus leaves elevator car 10 and follows guide path 112 to the location of cart 200.

Cart 200 is engaged by vehicle 14 for transport back to elevator car 10; the engagement may be accomplished by a variety of well known means such as those described in U.S. Pat. Nos. 4,077,535 or 4,062,465 in which vehicle 14 slides beneath cart 200 and lifts it for supported transport; or a probe on vehicle 14 may engage a latch on cart 200 and simply tow it. After cart 200 is loaded by vehicle 14, it returns to waiting elevator car 10; as vehicle 14 enters the elevator, positioning control means 38 stops vehicle 14 so that transformer halves 42 and 44 are aligned. Doors 16A close and elevator car 10 is transported to floor 20 to discharge cart 200' thereon through doors 20B in position for unloading and subsequent passage through cart washer 220. During the vertical transit to floor 20, flywheel 30 of vehicle 14 is recharged as described above.

Throughout the sequence just described, the system command center by appropriate signals "lock outs" the clean areas on each floor to prevent inadvertent comingling of soiled cart 200 with clean goods on those floors.

What is claimed is:

1. A material handling system for servicing a plurality of vertically spaced levels of a structure, said system comprising:
   an unmanned vehicle adapted to transport cargo between said vertically spaced levels;
   electro-mechanical drive means for propelling said vehicle along a surface of a selected one of said levels;
   means disposed within said vehicle for storing energy and for imparting said stored energy to said electro-mechanical drive means;
   means for vertically moving said vehicle to each of said spaced levels; and
   means coupling said vehicle and said vertical moving means while said vehicle is supported by said vertical moving means for transmitting energy from an external source to said energy storage means, said energy transmission means being deployed within and movable with said vertical moving means, and being operable while said vertical moving means is moving vertically;
   said vertical moving means being free of interior obstructions to safe occupancy and movement by passenger personnel and thereby being adaptable, without modification, for transporting said passenger personnel between said vertically spaced levels.

2. A material handling system as recited in claim 1 wherein:
   said energy storage means includes a flywheel which is operably connected to said electro-mechanical drive means.

3. A material handling system as recited in claim 2 wherein:
   said electro-mechanical drive means includes a motor/generator having a shaft operably connected to said flywheel.

4. A material handling system as recited in claim 3 wherein:
   said energy transmission means comprises a split transformer, one half of which is carried by said vertical moving means and is energized by an external source, and the other half of which is disposed in said vehicle and transmits energy induced therein to the motor portion of said motor/generator for charging said flywheel.

5. A material handling system as recited in claim 1 which further comprises:
   means for positioning said vehicle with respect to said vertical moving means to accomplish said coupling therebetween.

6. A material handling system as recited in claim 1 wherein:
   said energy storage and imparting means includes means for accepting energy generated by said electro-mechanical drive means during periods of deceleration of said vehicle.

7. An unmanned, self propelled vehicle used in conjunction with an elevator car, having a first half of a split transformer embedded in its floor, for servicing various vertical levels in a multi-story building, the vehicle comprising:
- a flywheel;
- a dynamo electric machine, connected to said flywheel, operable as a motor for charging said flywheel and as a generator for accepting power from said flywheel;
- a plurality of wheels supporting the vehicle;
- electrical drive means connected between said dynamo electric machine and at least one of said plurality of wheels for driving the vehicle with power from said dynamo electric machine when the vehicle makes excursions from the elevator car;
- a second half of the split transformer disposed on the vehicle to be positioned in close proximity to and inductively coupled with the first half of the split transformer when the vehicle is in the elevator car;
- charging means connected between said second half of the split transformer and said dynamo electric machine for supplying power to said dynamo electric machine when the vehicle is in the elevator car; and
- control means for operating said dynamo electric machine as a motor when the vehicle is disposed in the elevator car and for operating said dynamo electric machine as a generator when the vehicle makes excursions from the elevator car.

* * * * *

UNITED STATES PATENT AND TRADEMARK OFFICE
CERTIFICATE OF CORRECTION

PATENT NO. : 4,279,563
DATED : July 21, 1981
INVENTOR(S) : William R. Miller

It is certified that error appears in the above-identified patent and that said Letters Patent are hereby corrected as shown below:

Col. 3, line 66, delete "1973," and substitute therefor --1973.--; and

Col. 6, line 56, delete " "single" output 11 ", and substitute therefor --"single output"--.

Signed and Sealed this

Third Day of November 1981

[SEAL]

Attest:

GERALD J. MOSSINGHOFF

Attesting Officer

Commissioner of Patents and Trademarks